United States Patent [19]

Berrebi et al.

[11] Patent Number: 5,499,746
[45] Date of Patent: Mar. 19, 1996

[54] PROCESS AND APPARATUS FOR LOADING AND UNLOADING POWDER CATALYST

[75] Inventors: Georges Berrebi, Bourg Les Valences; Yves Jacquier, Granges Les Valence; Habbo Edens; Gerrit Middelkoop, both of Pays-Bas, all of France

[73] Assignee: Europeenne de Retraitement de Catalyseurs Eurecat, La Voulte sur Rhone, France

[21] Appl. No.: 225,725

[22] Filed: Apr. 11, 1994

[30] Foreign Application Priority Data

Apr. 9, 1993 [FR] France .................. 93 04358

[51] Int. Cl.[6] .................. B67D 5/64
[52] U.S. Cl. .................. 222/165; 248/142
[58] Field of Search .................. 222/164, 165, 222/166, 167, 181, 153, 463, 146.2; 141/3; 74/577 R, 577 S, 577 M; 414/421; 248/142

[56] References Cited

U.S. PATENT DOCUMENTS

| | | | |
|---|---|---|---|
| 1,233,091 | 7/1917 | Maier | 248/142 |
| 1,326,077 | 12/1919 | Manahan | 248/142 |
| 1,557,273 | 10/1925 | Secrist | 222/165 |
| 1,779,352 | 10/1930 | Becker | 248/142 |
| 3,874,557 | 4/1975 | Porter | 222/146.2 |
| 4,278,386 | 7/1981 | Eranosian | 414/421 |
| 4,662,669 | 5/1987 | Erickson et al. | 222/166 |
| 4,750,646 | 6/1988 | Gerich | 222/166 |
| 4,836,421 | 6/1989 | Miyoshi et al. | 222/166 |
| 4,944,432 | 7/1990 | Jouillat | 141/3 |

FOREIGN PATENT DOCUMENTS

| | | | |
|---|---|---|---|
| 1090515 | 3/1955 | France . | |
| 2645567 | 10/1990 | France . | |
| 1510378 | 5/1978 | United Kingdom | 222/166 |

*Primary Examiner*—Andres Kashnikow
*Assistant Examiner*—Philippe Derakshani
*Attorney, Agent, or Firm*—Millen, White, Zelano, & Branigan

[57] ABSTRACT

The invention relates to a process and apparatus for transport, storage, loading and unloading of catalyst or adsorbent particles utilizing a special container equipped with a fluid-tight valve and which can rock progressively by means of a reverse-lock, escapement-type ratchet.

3 Claims, 1 Drawing Sheet

U.S. Patent    Mar. 19, 1996    5,499,746
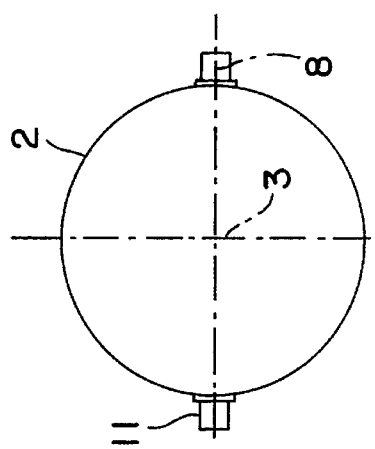
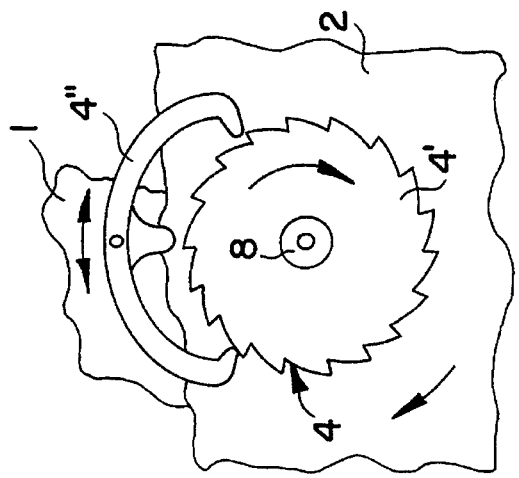
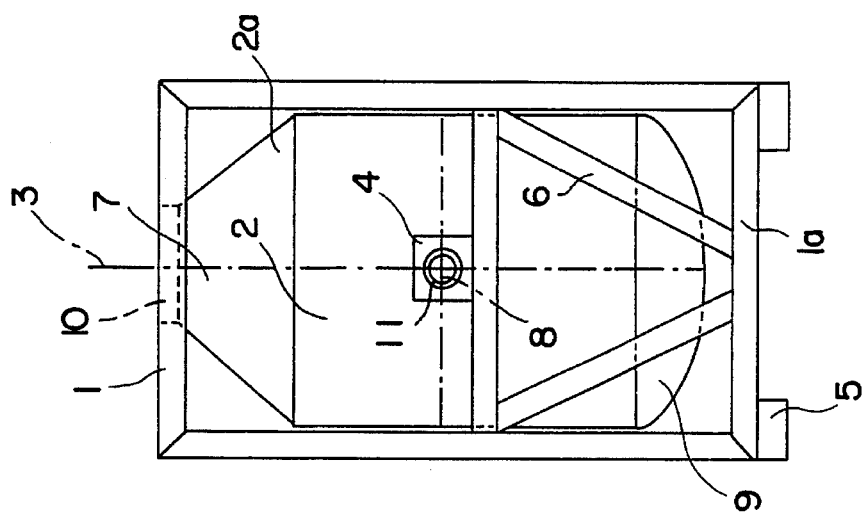
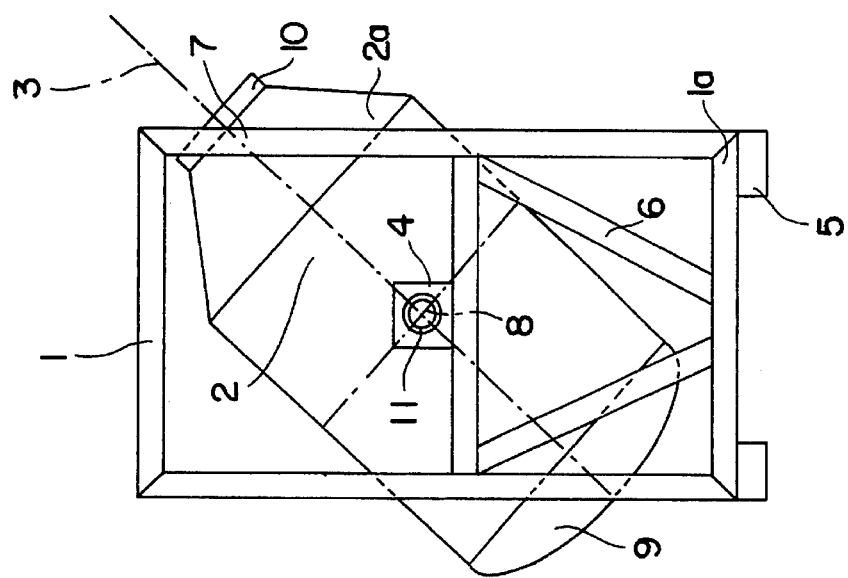

1

PROCESS AND APPARATUS FOR LOADING AND UNLOADING POWDER CATALYST

BACKGROUND OF THE INVENTION

This invention relates to the use of special containers for the handling of powder products that exhibit, for their handling, the following characteristics: pyrophoric, self-oxidizing or self-heating products. The powder products are, in particular, catalysts (in balls, extruded or pellets or in any other equivalent shape) for conversion or hydroconversion of hydrocarbons, i.e., catalysts for refining, petrochemistry or chemistry. These products can also be adsorbents.

SUMMARY OF THE INVENTION

The containers described in this invention make possible a handling that is easy and without danger for the operators and technicians responsible for the handling of the catalysts. These containers are thus suitable both for the loadings and/or unloadings of catalysts and for the storage of these catalyst and for their transport under conditions of perfect safety in accordance with "UN classification 4-2" standards.

These containers are thus advantageously likely to replace the current drums that pose problems of recycling, handling and safety.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 1 is a side view showing the container of the present invention tilted for unloading;

FIG. 2 is a side view showing the container in a transport mode;

FIG. 3 is a bottom view of the container; and

FIG. 4 is a side view of an escapement mechanism for holding the container in a tilted position after it is rocked.

DETAILED DESCRIPTION

The apparatus used in this invention comprises a stable framework 1 having a base 1a resting, for example, on feet 5 or equivalent devices such as rails or channels and provided with grasping devices at its upper part disposed proximate opposite sides of the base. This framework is optionally reinforced with suitable jamb posts such as 6 extending obliquely with respect to the base 1a. It can therefore be handled easily with lift trucks or with cranes and be loaded and displaced in trucks, ships or aircraft.

Container 2 itself is set in the framework 1 (or metal frame). This container is of any standard shape known to a person skilled in the art: cylindrical for example, or spherical, or parallelepipedal. The container is provided with a single opening 7 at its upper part and with a solid bottom 9: the filling and emptying is therefore performed through this same opening. This opening 7 is equipped with a thoroughly fluid-tight valve 10, preferably a valve of the ball valve type and is concentric with a longitudinal axis 3 of the container 2.

The container used in this invention has the advantage of considerably improving the handling because it pivots on itself via horizontal trunnion 11 for its emptying, thanks to its installation on its metal frame. This pivoting is performed around a horizontal axis 8 passing through the center of the container and perpendicular to the longitudinal axis 3.

Thanks to an original device, an unwanted or untimely rocking of the container during its handling, its emptying, its filling or its storage cannot occur.

This original device 4 is a reverse-lock ratchet that prevents the container from being moved in an uncontrolled way, by going from a lower portion during an unloading or to a higher position during a return of the container to its high position.

The container can therefore pivot only at the progressive speed desired by the operator responsible for the handling of the container. Device 4 is similar or equivalent to the escape wheels of time-piece mechanisms (watches, clocks, etc.) cited hereby way of reference.

The container can be equipped with a pressure-indicating manometer, with a safety valve set at a desired pressure, and/or with a device for injection of nitrogen or other gas and for purging, equipped with a valve. It is equipped with a suitable valve system that makes it possible to purge the container when it is empty (with nitrogen, for example).

The container is normally made of steel, stainless or not and has a frustoconical top portion 2a.

The design of the container and the quality of the ball valve make it possible for this container to withstand a pressure of several bars, for example 3 bars.

This container makes it possible to pack, store, transport and handle catalysts or adsorbents without specific atmosphere: nitrogen, argon, steam, hydrogen, gaseous hydrocarbons such as methane, chloride, hydrogen chloride, or mixtures of these gases. It can contain catalysts or adsorbents of various types, for example, used hydrotreating catalysts containing carbon and sulfur coming from hydrotreating units of petroleum cuts in a refinery. These used catalyst are classified in the category of self-heating products of classification 4.2 according to the UN nomenclature. They can be partially passivated according to existing technologies such as those using passivating products of the NK103 or CATNAP type.

FIG. 2 shows the apparatus with a container in high or rest position (full, empty and/or during transport).

FIG. 3 shows container 2 in aerial view, being able to pivot around its horizontal axis 8 around nuts (or similar device).

The container can have an effective volume of 0.1 to 12 $m^3$, preferably 0.5 to 5 $m^3$.

It can be designed so that its dimensions make it possible to load it in maritime containers.

In brief, the invention relates to a process for transport, or loading and unloading of a powder catalyst, by means of an enclosure (intended to contain said powder adsorbent or catalyst) set in a stable support, said support being provided with feet or being able to be displaced along a rail, a channel or any other equivalent means, said enclosure being able to pivot around its horizontal axis for loading and unloading operations of the catalyst, the process being characterized in that said enclosure (or "container") pivots by controlled and progressive rocking by means of a reverse-lock ratchet similar to an escape wheel. The enclosures is of the "container" type, preferably metal, for example stainless steel.

As is seen in FIG. 4, the escapement comprises a toothed wheel 4' which is fixed to the container 2 and a pawl 4". By rocking the container, the pawl 4" releases and then reengages with the toothed wheel stopping rotation of the container and holding the container in position so that the container is indexed in its rotation and advances in increments.

The process applies to the transport/storage or to the loading and unloading of pyrophoric catalysts or to the transport/storage or to the loading and unloading of catalysts having a self-oxidizing characteristic and/or to the transport/storage or to the loading and unloading of catalysts having a self-heating characteristic.

The entire disclosures of all applications, patents and publications, cited above and below, and of corresponding application French No. 93/04.358, filed Apr. 9, 1993, is hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In combination:

a material selected from the group consisting of pyrophorbic catalysts, self-oxidizing catalysts, self-heating catalysts and adsorbents in solid form as powder, pellets or balls and an apparatus specifically for transporting, loading and unloading the material, the apparatus comprising:

a container for containing the material directly therein, the container having a longitudinal axis and a frustoconical top portion;

a frame for supporting the container;

a base for mounting the frame;

a horizontal trunnion extending from the container to mount the container in the frame for allowing the container to pivot about a horizontal axis which is always perpendicular to the longitudinal axis of the container;

a reverse-lock ratchet in the form of an escapement having pawl and ratchet .members with one of the members on the container and the other member on the frame for allowing the container to pivot about the horizontal axis and to maintain position as it is rocked to facilitate loading, transporting and unloading of the material in the container;

the container having a single opening through the frustoconical top portion which is concentric with the longitudinal axis of the container and which faces upwardly when transporting the material and faces laterally when unloading the material, the opening being closed by a fluid-tight valve to seal the container with respect to the atmosphere.

2. The combination of claim 1, wherein the apparatus includes spaced feet disposed proximate opposite sides of the base to facilitate transport of the apparatus containing the material by rail or channel.

3. The combination of claim 2, wherein the container is made of stainless steel.

* * * * *